US008880472B2

(12) United States Patent
Ponsford

(10) Patent No.: US 8,880,472 B2
(45) Date of Patent: Nov. 4, 2014

(54) METHOD OF BACKING-UP, AND MAKING AVAILABLE, ELECTRONIC DATA AND SOFTWARE INITIALLY STORED ON A CLIENT SERVER

(75) Inventor: Simon Ponsford, Bath (GB)

(73) Assignee: Tivarri Ltd. (GB)

( * ) Notice: Subject to any disclaimer, the term of this patent is extended or adjusted under 35 U.S.C. 154(b) by 132 days.

(21) Appl. No.: 13/403,061

(22) Filed: Feb. 23, 2012

(65) Prior Publication Data

US 2013/0212069 A1    Aug. 15, 2013

(30) Foreign Application Priority Data

Feb. 15, 2012   (GB) .................................. 1202603.5

(51) Int. Cl.
*G06F 7/00* (2006.01)
*G06F 17/00* (2006.01)

(52) U.S. Cl.
USPC ........................................................ 707/646

(58) Field of Classification Search
None
See application file for complete search history.

(56) References Cited

U.S. PATENT DOCUMENTS

| 2010/0049930 | A1* | 2/2010 | Pershin et al. | 711/162 |
| 2011/0071983 | A1* | 3/2011 | Murase | 707/649 |
| 2011/0106768 | A1* | 5/2011 | Khanzode et al. | 707/646 |
| 2011/0125648 | A1* | 5/2011 | Price et al. | 705/50 |

FOREIGN PATENT DOCUMENTS

| WO | WO 2008/003026 | 1/2008 |
| WO | WO 2009/031157 | 3/2009 |
| WO | WO 2011/053450 | 5/2011 |

OTHER PUBLICATIONS

Search Report received in GB Application No. GB1202603.5, dated May 22, 2012.

\* cited by examiner

*Primary Examiner* — Uyen Le
(74) *Attorney, Agent, or Firm* — Robert Plotkin, P.C.

(57) ABSTRACT

Methods and systems for allowing the backing-up of electronic data, its accessibility in times of need, and the ability to restore this data without denying user access to it while the restoration occurs. Also, the data may continue to be backed-up while it is being restored. One method allows for the removal of duplicated data from within the on or off-site copy and subsequent incremental on or off-site-site copies of the data. In this way, the amount of bandwidth and storage required may be reduced. For example, if there are two sets of files required to run two applications and some or all of these files are identical then only one copy need be made and sent and stored. This also applies where the on-site appliance is connected to more than one client server, such that data which is common to the client servers may only be copied once.

13 Claims, 9 Drawing Sheets

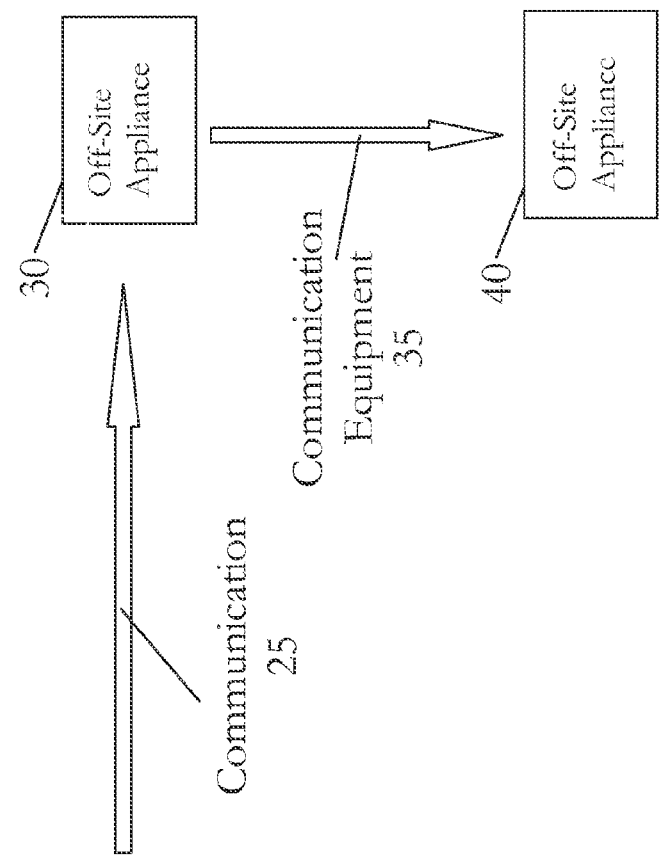
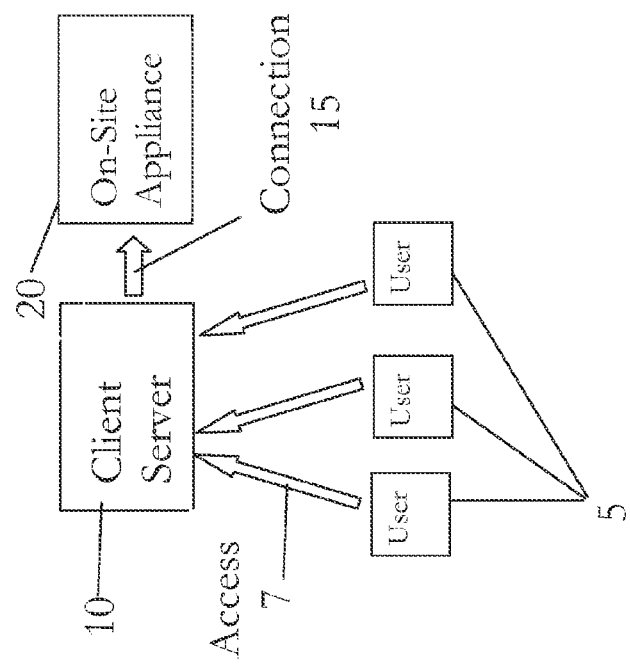
Figure 1

A method of backing-up, and making available by alternative means, electronic data and software initially stored on a client server located at a client's site, the method comprising the steps of

↓ a. providing an on-site appliance at the client's site and connecting it to the client server

↓ b. making an on-site copy of data and software, stored on the client server, and storing it in the on-site appliance

↓ c. sending an off-site copy of this on-site copy to, and storing it on, at least one off-site appliance at one or more sites remote from the client's site

↓ d. repeatedly making incremental on-site copies of the data and software stored on the client server, and storing them on the on-site appliance, at predetermined points in time after step b, each incremental on-site copy only containing data and software which is different to that of either the on-site copy made in step b or the latest incremental copy

↓ e. sending an off-site copy of each incremental on-site copy to, and storing it on, the at least one off-site appliance

↓ f. using the on-site appliance to create an on-site virtual hard disc from the on-site copy

↓ continued        Figure 5

A method of backing-up, and making available by alternative means, electronic data and software initially stored on a client server located at a client's site, the method comprising the steps of:

↓ a. providing an on or off-site appliance and connecting it to the client server

↓ b. providing a first stand-by server and connecting it to the on-site appliance

↓ c. making a first copy of data and software, stored on the client server, and storing it in the appliance

↓ d. sending a second copy of the first copy to, and storing the second copy on, the first stand-by server

↓ e. repeatedly making incremental copies of the data and software stored on the client server, and storing them on the appliance, at predetermined points in time after step b, each incremental copy only containing data and software which is different to that of either the copy made in step b or the latest incremental copy

↓ f. sending a copy of each incremental copy to, and storing it on, the first stand-by server

↓ continued    Figure 7

METHOD OF BACKING-UP, AND MAKING AVAILABLE, ELECTRONIC DATA AND SOFTWARE INITIALLY STORED ON A CLIENT SERVER

The present invention relates generally to a method of backing-up, and making available, electronic data and software initially stored on a client server, and finds particular, although not exclusive, utility in disaster recovery scenarios.

To-date, systems have been available which allow users to back-up data from their servers, store it on-site and/or off-site, and restore it, as necessary, to their server. The back-ups can occur at set intervals, such as every 15 minutes thus creating 96 copies per day. This means that there could be many thousands of individual copies created. Although with today's relatively inexpensive computer storage the volume of files is not an issue, there is presently a limit of approximately 1,000 incremental back-ups that can be successfully restored. If more than approximately 1,000 incremental back-ups are restored then the data can become corrupted. One way to overcome this problem is to take multiple incremental back-ups and consolidate them into fewer incremental files. For example, a backup may be made every 15 minutes for two days, with the resulting files being consolidated into a single incremental file, rather than 96 individual incremental files. However, this has the drawback that the granularity is reduced as if, for instance, a file has been amended many times in a day and the incremental copies have been consolidated, the copy now only contains the data as it was at the end of the day as there is no longer a record of these intermediate versions of files. For some users, such as the financial services sector, granularity is extremely important and therefore requires all the intermediate incremental copies to be restored also.

Accordingly, another known system allows for an original initial "base" copy to be made and then differential copies to be made every so often (such as every 15 minutes) which differ from the original initial copy. In this way, if the data needs to be restored only the original initial copy and the latest differential copy need be used.

However, such a system has its own inherent problems in that the differential file will become relatively large quite quickly. This means that very large amounts of storage are required and that taking backups every 15 minutes becomes impractical as too much data needs to be backed-up each time. This can lead to the situation where the next back-up cannot start because the previous back-up has not yet finished.

Regardless of whether a system can successfully restore more than 1,000 back-ups, another issue with known disaster recovery systems is that it can take many hours, if not days to restore the data (which can include for example operating system, applications, databases and data files), particularly if the only usable copy of the data is offsite and needs to be transferred back to the onsite location before it can be used, this transfer either occurring by means of physical transportation of a computer disk or other data storage medium or transfer over a computer network. Furthermore, even though the backed-up data may be accessible while restoration is occurring, new data being created by the user is not able to be continually and simultaneously backed-up. This is obviously a serious drawback.

Another drawback of known disaster recovery systems is a limitation such as the need to locate the equipment storing the back-up relatively close to the equipment containing the original data or to install expensive, high bandwidth, low latency networks between the equipment. In one example, the two sets of equipment need to be in the same building which presents risk issues.

Another known limitation in one system is that the original data is backed-up virtually instantaneously (replicated) and is in reality just a mirror image of the original data. This means that if a file is accidentally deleted or becomes corrupted then the same occurs to the back-up copy.

Yet another known drawback is that the equipment used to restore the back-up data must be exactly the same as the equipment storing the original data so that it can replace the original equipment in cases of disaster recovery.

In some systems the equipment storing the original data is connected directly to the equipment storing the back-ups without any intermediate data storage. This has the effect that if the connection is lost the storage buffer in the original equipment can quickly become full, as it is not designed for this use, causing the equipment to crash.

These and other problems are addressed by the present invention.

In a first aspect, the invention provides a method of backing-up, and making available, electronic data and software initially stored on a client server located at a client's site, the method comprising the steps of:

a. providing an on-site appliance at the client's site and connecting it to the client server;
b. making an on-site copy of data and software, stored on the client server, and storing it in the on-site appliance;
c. sending an off-site copy of this on-site copy to, and storing it on, at least one off-site appliance at one or more sites remote from the client's site;
d. repeatedly making incremental on-site copies of the data and software stored on the client server, and storing them on the on-site appliance, at predetermined points in time after step b, each incremental on-site copy only containing data and software which is different to that of either the on-site copy made in step b or the latest incremental copy;
e. sending an off-site copy of each incremental on-site copy to, and storing it on, the at least one off-site appliance;
f. using the on-site appliance to create an on-site virtual hard disc from the on-site copy;
g. using the on-site appliance to update the on-site virtual hard disc by adding each incremental on-site copy to the latest on-site virtual hard disc, this update occurring after an incremental on-site copy is stored on the on-site appliance;
h. using at least one off-site appliance to create an off-site virtual hard disc from the off-site copy;
i. using the at least one off-site appliance to update the off-site virtual hard disc by adding each incremental off-site copy to the latest off-site virtual hard disc, this update occurring after an incremental off-site copy is received at the at least one off-site appliance;

and on demand;

j. updating the latest virtual hard disc on the on-site appliance, or at least one of the off-site appliances, comprising the latest on-site or off-site virtual hard disc and one or more selected incremental on-site or off-site copies;
k. booting the updated virtual hard disc to create a virtual client server;
l. making the data and software on the virtual client server available to users via the on-site or off-site appliance;
m. repeatedly making incremental copies of the data and software on the virtual client server, and storing them on the on-site, and/or the at least one off-site, appliance at predetermined points in time after step l, the incremental copies only containing data and software which is different to that of the data and software on either the updated virtual hard disc created in step k or the latest incremental copy.

The terms electronic data and software may include computer programs, operating systems, computer applications, data files necessary for the customising and/or operation of programs and applications, word processing documents, spreadsheets, databases, images, and so on. Throughout this specification the term "data" will be used for simplicity, however, it is not meant to limit the invention.

The on-site appliance may include computer hardware such as a motherboard, processing chips, memory, communication elements and the like. It may include computer programs necessary to operate some or all of the functionality of the method.

The on-site appliance may be connected to the client server for communication therewith.

The off-site appliance may comprise similar components (hardware and software) as the on-site appliance. There may be more than one off-site appliance. The copies may be sent to each from the on-site appliance, and/or the off-site appliances may communicate with one another to send these files.

The on-site and off-site appliances may be preconfigured servers pre-programmed with specific application(s).

The storing of the on-site copy on the on-site appliance may occur after a predetermined time interval. Similarly, the sending of it to the off-site appliance may occur after a predetermined time interval.

The predetermined points in time for the making of the incremental copies may be every 15 minutes, although other time periods such as every hour, every 2 hours, every 4 hours, every day and so on are contemplated.

Because the incremental copies contain files and data etc. which are different from the last copy, their retention thus provides a high level of granularity on restoration.

The sending of the copies to the off-site appliance may occur substantially immediately after creation, although a delay may be introduced, such as 15 minutes, an hour, 2 hours, 4 hours, a day and so on.

The term "virtual hard disc" is used generically and is not meant to limit any aspect of the invention to use on any particular manufacturer's hardware or with any particular manufacturer's software. In particular, the term could as well be replaced with the term "virtual machine disc" and so on.

The initial creation of the virtual hard disc may take several hours, however, only having to update it afterwards, each time an incremental copy is added, the time taken to provide an updated virtual hard disc, in the event of failure of the client server, may be relatively short such as a few minutes only.

Steps (j) to (m) relate to the situation where the client server, or the client server and the on-site appliance become unavailable to the client's users. This may occur after a fire, infection from a computer virus, etc.

These steps refer to the on-site appliance or at least one off-site appliance, because if only the client server has failed the on-site appliance may only be required, initially, to provide substantially immediate alternative user access to the client's data and software.

For instance, in step (j) if the client server only has failed, the on-site appliance may update the latest stored copy of the virtual hard disc with the latest incremental copy, if this step has not already occurred. It may then boot this virtual hard disc to create a virtual client server. The virtual client server may then be made available, via a suitable network, to the users.

Now that the data is still accessible and is being actively used again, the files will be changing. Accordingly, to ensure continuity of data retention, the system is able to continually back-up as before. However, rather than copies of the data on the client server being copied to the on-site appliance and the off-site appliance, the copies are of the data on the virtual client server. The copies are still retained on the on-site appliance and copied to the off-site appliance as before.

If in steps (j) to (m) both the on-site appliance and client server become unavailable then the virtual hard disc may be created on the off-site appliance or indeed any other off-site equipment suitable for managing such a task.

Data may then be accessed by the users via any suitable network or connection and incremental copies of the data may be stored on the off-site appliance and/or another off-site appliance.

The virtual client server may be created on the on-site appliance, the off-site appliance or on another server with appropriate hypervisor software.

The term "system" may also be considered to be a computer network. The step of updating the on-site virtual hard disc in step g may occur after a first predetermined time delay, and the updating of the off-site virtual hard disc in step i may occur after a second predetermined time delay.

The time delays may be zero such that the updating site may occur substantially immediately after receipt of the latest incremental copy. However, the updating could occur after a predetermined delay such as 30 minutes, an hour, 2 hours, 4 hours, a day, and so on. The first and second predetermined time delays may be equal or unequal. In one embodiment, the on-site virtual hard disc may be updated after 30 minutes and the virtual hard disk on the off-site appliance may be updated after 12 hours. In this way, if the client server, and thus the on-site appliance, become infected with a computer virus, the virtual hard disc on the off-site appliance may be protected in that its update may be prevented from occurring as soon as the virus is detected.

The hardware required for sending copies and allowing access to data may be the internet, a LAN, a WAN, a VPN or any other electronic communication equipment in steps, as required. All transmissions may be encrypted.

The method allows for the removal of duplicated data from within the on or off-site copy and subsequent incremental on or off-site-site copies of the data. In this way, the amount of bandwidth and storage required may be reduced. For example, if there are two sets of files required to run two applications and some or all of these files are identical then only one copy need be made and sent and stored. This also applies where the on-site appliance is connected to more than one client server, such that data which is common to the client servers may only be copied once.

Although the above discussion explains how data may be made available at relatively short notice to the users if the client server or on-site appliance becomes unavailable, at some point in time a new replacement client server will probably be required, although this is not a pre-requisite as will be explained in more detail below.

The method therefore allows for the following steps to be taken:
  a. continuing with steps l and m of claim 1;
  b. providing a new client server at the client's site;
  c. sending a copy of the on-site copy of data and software and selected subsequent incremental copies stored on the on-site or at least one off-site appliance to the new client server;

d. withdrawing user access to the virtual client server, and using the on-site or off-site appliance to make a final incremental copy of the data and software on the virtual client server;

e. sending this final incremental copy to the new client server, and f. making the data stored on the new client server available to users.

Step c may include the step of merging the copies on the on-site or at least one off-site appliance as a new file before sending this new file to the new client server.

An advantage of the present invention is that the client server may be replaced while the data is still being accessed and still being backed-up. Once the new client server is provided, a copy of all of the copies held on the on-site appliance may be sent to it. If the copies are sent with the oldest being sent first then when the latest is reached it will also include the most recent incremental copy. Accordingly, the client server may then only be a few minutes behind the virtual client server.

However, if the reason for the failure in the first place is corrupted data, such as because of an infection by a computer virus, then not all of the incremental copies may be sent back to the new client server. Selected ones containing the computer virus may be excluded.

Access to the virtual client server may then be suspended, such as at the end of a working day for instance. A new incremental copy may then be made and sent to the new client server, including any changes not previously accounted for and excluding any corruptions, bringing it completely up-to-date. Access to the data may then be switched to the new client server from the previous virtual client server. Backing-up may then revert to the original situation as described above.

In this method the copies may be merged before being sent to the new client server. This allows for much faster transmission of the data.

In a situation where both the client server and the on-site appliance have become unavailable, the method allows for the following steps:

a. continuing with steps l and m of claim 1, wherein the virtual client server is hosted by the at least one off-site appliance;

b. providing a new on-site client server and on-site appliance at the client's site;

c. sending a copy of the off-site copy of data and software and selected subsequent incremental copies to the new on-site appliance;

d. merging the copies sent in step c on the new on-site appliance as a new file;

e. sending a copy of this merged file to the new client server;

f. withdrawing user access to the virtual client server, making a final incremental copy of the data and software on the virtual client server, and sending it to the new on-site appliance;

g. updating the new client server with the final incremental copy; and h. making the new client server available to users.

The method is similar to that described above for the scenario where only the client server has become unavailable. However, there are differences which are readily understandable in the light of this specification.

Not only may incremental copies of the data be made in step (m) but a new virtual hard disc may be created and kept updated on another off-site appliance, if necessary or required. In this way, if the off-site appliance failed before the new on-site appliance and client server had been replaced and made available to the users there would be the possibility of the creation of another virtual server on this other off-site appliance.

The sending of the copies from the off-site appliance to the on-site appliance may be via electronic equipment and/or physical equipment. For instance, the original copy may be sent on a disc by courier and the incrementals may be sent electronically over telephone wires or other data network.

The method allows for the situation where if a connection via internet, LAN, WAN, VPN, or other electronic communication equipment is temporarily lost during the sending of data over it, the sending of all non-previously transferred copies is resumed from the point in the data where the connection was lost when the connection becomes available again.

Another option, where the connection between the on-site and off-site appliances is lost for a period of time, is that on reconnection only the differences, between the last incremental copy sent before the connection was lost and the last incremental copy made before the connection was restored, are sent. However, the level of granularity may be reduced.

At least one of the off-site appliances may be located at the client's site. This may provide further "redundancy" in the system as another back-up, should the internet or other external connections become unavailable. In this way, the copies meant for the off-site appliance, which actually is on-site, may be diverted, or continue to be sent, to the off-site appliance that is actually on-site. This allows for another appliance which can create a booted virtual hard disc presented as a virtual client server in a matter of minutes and that is up-to-date.

In a similar manner, there may be more than one on-site appliance.

In one embodiment, when restoring a new client server, the disc partition may be restored initially. This may be where the operating system resides. The server may then be booted and virtual references created for any other drives. The non-system drives may then be restored, with files requested by the operating system prioritised so the server can operate as quickly as possible.

If the new client server is different from the one it replaces then it may well require different driver software and files to operate than the ones backed-up. To overcome this problem the method allows for the creation of boot media (CD, USB, network boot files or other medium), including some or all of the necessary hardware drivers, to be created on the on-site or off-site appliance (as necessary or as required). This may then be sent to the client for use with the new client server. The new client server may then be booted from this boot media. Any other drivers and other files required may be called by the new client server from the on or off-site appliances and/or from other suppliers, such as manufacturer's websites. Restoration may then occur as previously discussed.

The method may allow for the provision of a user interface provided on a computer screen to effect control of the method, its hardware and software.

In another embodiment, the method may further include the steps of:

a. providing a stand-by server connected to the on or off-site appliance;

b. sending a stand-by copy of the on-site copy and incremental copies made in steps (b) and (d) of claim 1 to the stand-by server.

The stand-by server may be physical or virtual. The stand-by server may be located on-site or off-site. The sending of the copies to the stand-by server may occur after a third predetermined time delay after their creation. The stand-by server may be started, for the purposes of receiving copies, using the boot media created as described above.

The method may further comprise the steps of:
a. updating the stand-by server by adding one or more selected incremental copies to the copies already stored on it;
b. making the stand-by server available to users of the client server as an alternative server; and
c. backing-up the stand-by server to the on-site appliance or off-site appliance repeatedly.

In this manner if the client server becomes unavailable to its users, the stand-by server may be accessed. This may occur after it has been restarted after having access to the boot media blocked, such as by removing the boot media USB etc. It may continually be backed-up in a similar manner to that described above with regard to the virtual server created from the virtual hard disc. The back-ups may be sent to the on-site and/or the off-site appliance. This enables recovery and continued use of data with very little time delay from when the client server becomes unavailable and allows any data newly created on the stand-by server to be continually backed-up.

In a second aspect, the invention provides a method of accessing data and/or software stored as an initial copy and subsequent incremental electronic copies on an on-site or off-site appliance comprising the steps of:
a. creating a virtual hard disc, from an initial copy of the data and/or software, in an isolated virtual network on the on-site or off-site appliance;
b. updating the virtual hard disc with selected incremental copies of the data.

In a third aspect, the invention provides a method of backing-up, and making available, electronic data and software initially stored on a client server located at a client's site, the method comprising the steps of:
a. providing an on or off-site appliance and connecting it to the client server;
b. providing a first stand-by server and connecting it to the on-site appliance;
c. making a first copy of data and software, stored on the client server, and storing it in the appliance;
d. sending a second copy of the first copy to, and storing the second copy on, the first stand-by server;
e. repeatedly making incremental copies of the data and software stored on the client server, and storing them on the appliance, at predetermined points in time after step b, each incremental copy only containing data and software which is different to that of either the copy made in step b or the latest incremental copy;
f. sending a copy of each incremental copy to, and storing it on, the first stand-by server;
g. updating, after a predetermined time interval, the copy sent to the first stand-by server in step d with each incremental copy sent in step f;
and on demand;
h. updating the copy sent to the first stand-by server in step d with one or more selected incremental copies sent in step f, as required; and
i. repeatedly making incremental copies of the data and software on the stand-by server and sending them to the appliance and/or a second stand-by server.

In this manner, the stand-by server allows virtually uninterrupted access to the client's data whilst still being backed-up. This may occur after it has been restarted after having access to the boot media blocked, such as by removing the boot media USB etc. Prior to acting as an alternative client server the stand-by server may be started, for the purpose of receiving copies, using the boot media created as described above with regard to the first aspect.

The location of the first stand-by server may be either on-site or off-site. The location of the second stand-by server may also be either on-site or off-site. The storing of the copies in steps c and d each occurs after a selected time interval; the selected time intervals being the same or different and ranging from zero to greater than zero.

The first and/or second stand-by server may be physical or virtual.

In a fourth aspect, the invention provides a computer network arranged to operate in accordance with the methods of the first aspect. The computer network may include processors, servers, computers, communications equipment, phone lines, wireless links, VPNs, computer memory storage, and the like.

In a fifth aspect, the invention provides a server arranged to operate in accordance with the methods of the first aspect. The server or appliance may include one or more processors, communications equipment, phone lines, wireless links, VPNs, computer memory storage, and the like.

In a sixth aspect, the invention provides a computer program comprising computer program code adapted to perform all the steps of the method of the first aspect when said program is run on a computer.

In any one or more of the embodiments and aspects described herein, the term "server" may be interchangeable with the term "personal computer".

The term "merging" used herein may mean that the resultant merged file only includes the relevant differences between the incremental copies. This ensures that the newly merged file is smaller and thus quicker to restore. However, the merging process may allow for the granularity of the data and files to be retained, in other words, without loss of granularity.

Bandwidth usage in the transfer of data between appliances may be controlled by the time of day and/or the day of the week if the client does not have sufficient bandwidth for all updates to be transferred immediately at all times.

It may be possible to check for computer viruses and malware on any appliance, or other suitable server, by periodically making a copy of a virtual hard disc and scanning for viruses and or malware using existing tools. This may have the advantage that virus scans may not need to be run as frequently as typical on live systems, leading to improved performance.

Accordingly, in one embodiment the invention may provide a method of providing a copy of data, stored on a server, for the purpose of checking for computer viruses and/or malware, the method comprising the steps of providing an appliance at the client's site and connecting it to the client server; making an initial copy of data and software, stored on the client server, and storing it in the appliance; using the appliance to create a virtual hard disc from the copy; repeatedly making incremental copies of the data and software stored on the client server, and storing them on the appliance, at predetermined points in time after the initial copy, each incremental copy only containing data and software which is different to that of either the initial copy or the latest incremental copy; using the appliance to update the virtual hard disc by adding each incremental copy to the latest virtual hard disc, this update occurring after an incremental copy is received at the appliance; running a computer virus and/or malware check on the virtual hard disc. Optionally, a copy of the virtual hard disc may be used checked rather than the original.

A virtual hard disk may be used to test upgrades to systems by adding updated files to a copy of the virtual hard disk to then test if the system still works with the updated files in place. These could include application and operating system upgrades. In other words, in one embodiment the invention may include the steps of making a copy of the virtual hard disc and testing its performance and/or stability with newly added data.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention.

As used herein, the term "hypervisor" may refer to a program that is executed directly by the underlying hardware of a computing device to implement one or more separate virtual machines and one or more virtualized appliances using the underlying hardware. The term "hypervisor" may be viewed as synonymous to that of a "Virtual Machine Monitor" (VMM). As used herein, the term "virtual machine" may refer to a software implementation of a computing device that is configured to autonomously execute programs like a physical computing device.

It will be understood that the various features described herein in relation to one aspect may be applicable to another aspect.

The reference figures quoted below refer to the attached drawings.

FIG. 1 is a schematic of a system or computer network in normal backing-up operation;

Figure 2:
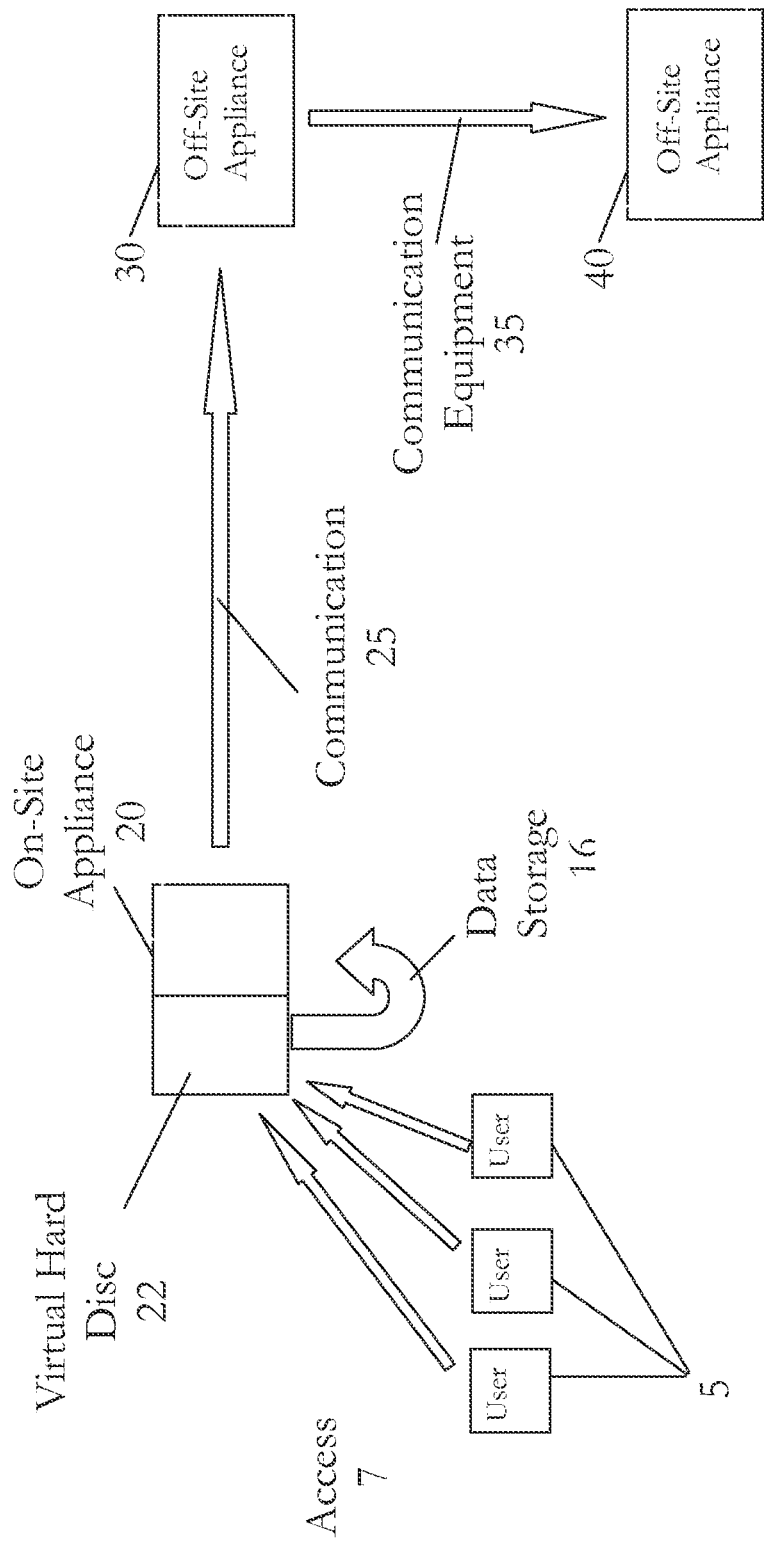
FIG. 2 is a schematic of the system with the client server unavailable.

The present invention will be described with respect to particular embodiments and aspects and with reference to certain drawings but the invention is not limited thereto but only by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the features listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may refer to different embodiments. Furthermore, the particular features, structures or characteristics of any embodiment or aspect of the invention may be combined in any suitable manner, as would be apparent to one of ordinary skill in the art from this disclosure, in one or more embodiments.

The terminology used herein is for the purpose of describing particular examples only and is not intended to be limiting. As used herein, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may, in some embodiments, mean only one.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

In FIG. 1 the client server 10 is accessed by users 5 via connection equipment 7. The client server is also connected 15 to an on-site appliance 20. The on-site appliance keeps copies of the data on the client server 10. Copies are also sent to the off-site appliance 30 via whatever communications 25 are available or chosen. Copies are also sent to another second off-site appliance 40 from the first off-site appliance 30 by communication equipment 35.

In FIG. 2, the client server 10 has become unavailable. A virtual hard disc 22 is therefore booted on the on-site appliance 20 for access 7 by the users 5. Copies of the data are continually made and stored 16 on the on-site appliance. Copies go off-site as before to the off-site appliances 30, 40.

Figure 3:
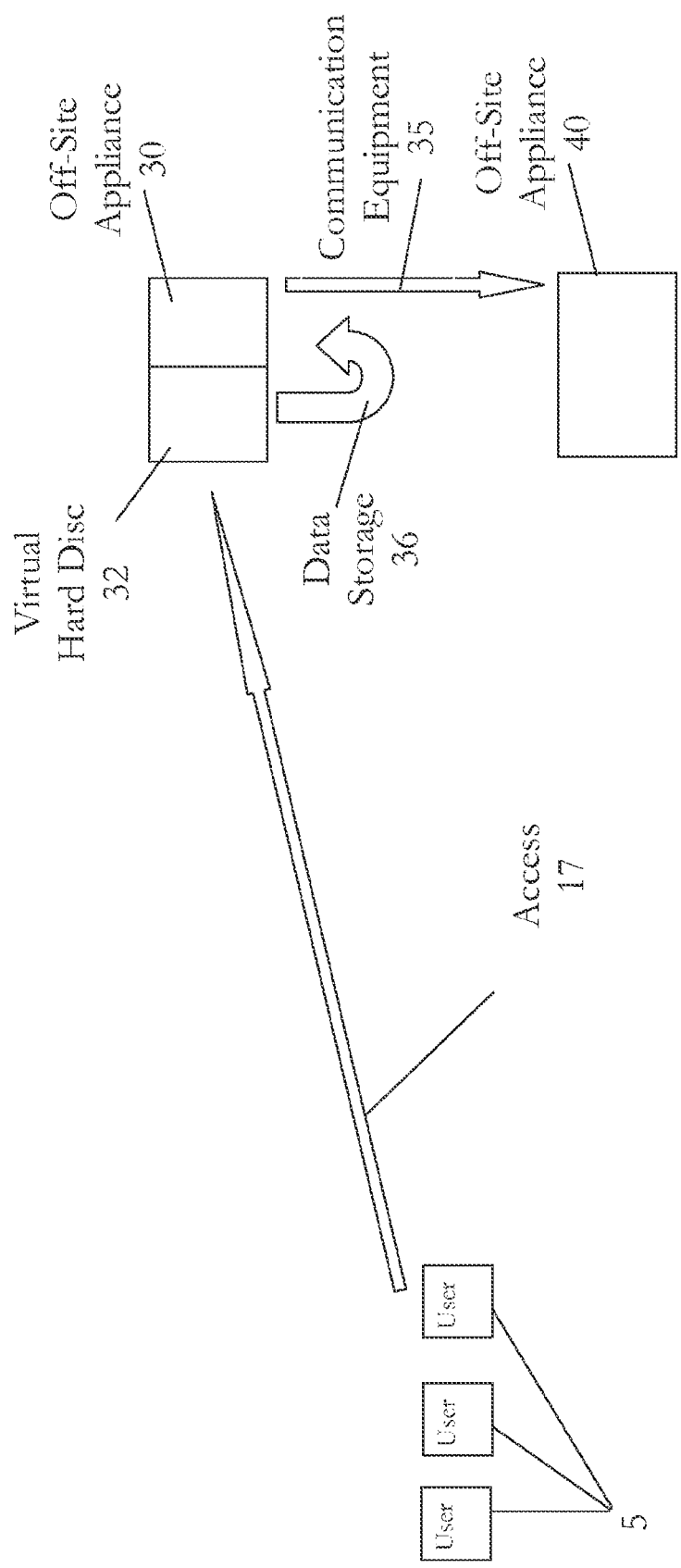
FIG. 3 is a schematic of the system with the client server and on-site appliance unavailable.

FIG. 3 presents a scenario where both the client server and the on-site appliance have become unavailable and users 5 access 17 a virtual hard disc 32 booted to become a virtual client server on the off-site appliance 30. Copies of the data are continually being made and stored 36 on the off-site appliance 30. Copies are also continually sent to the second off-site appliance 40. The users 5 do not necessarily have to be at the client site to access the virtual client server; they could be located anywhere in the world and access it via the internet or any other communication equipment.

Figure 4:
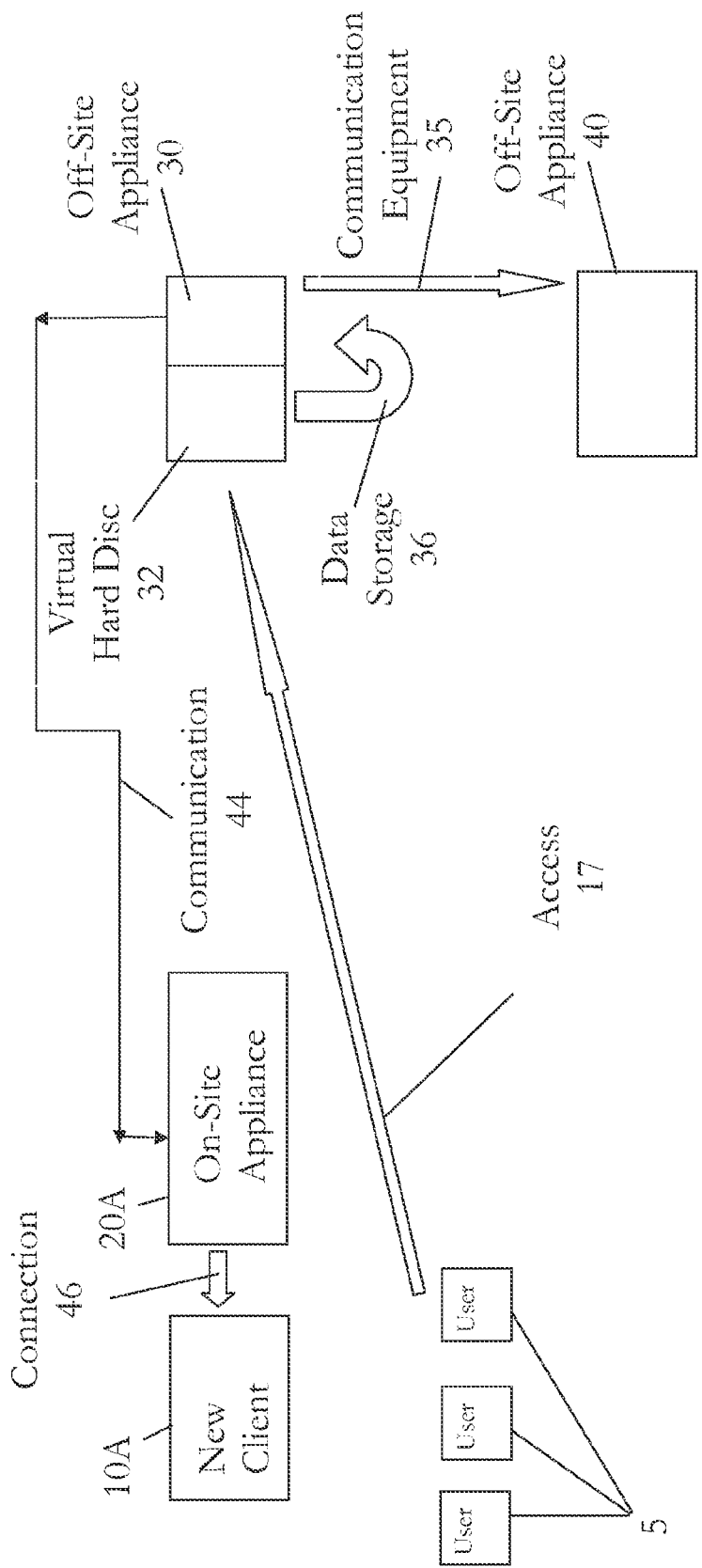
FIG. 4 is a schematic of the restoration to a new on-site appliance and client server.

FIG. 4 shows the scenario of FIG. 3 with the new client 10A and on-site appliance 20A in position. The copies are being sent back 44 to the new on-site appliance 20A from the off-site appliance 30 and from there to the new client server 10A via connection 46. Users 5 are still accessing the data on the virtual hard disc 32 on the off-site appliance 30 and the data is still being backed-up 36 to the off-site appliance 30 and the second off-site appliance 40.

Figure 5:
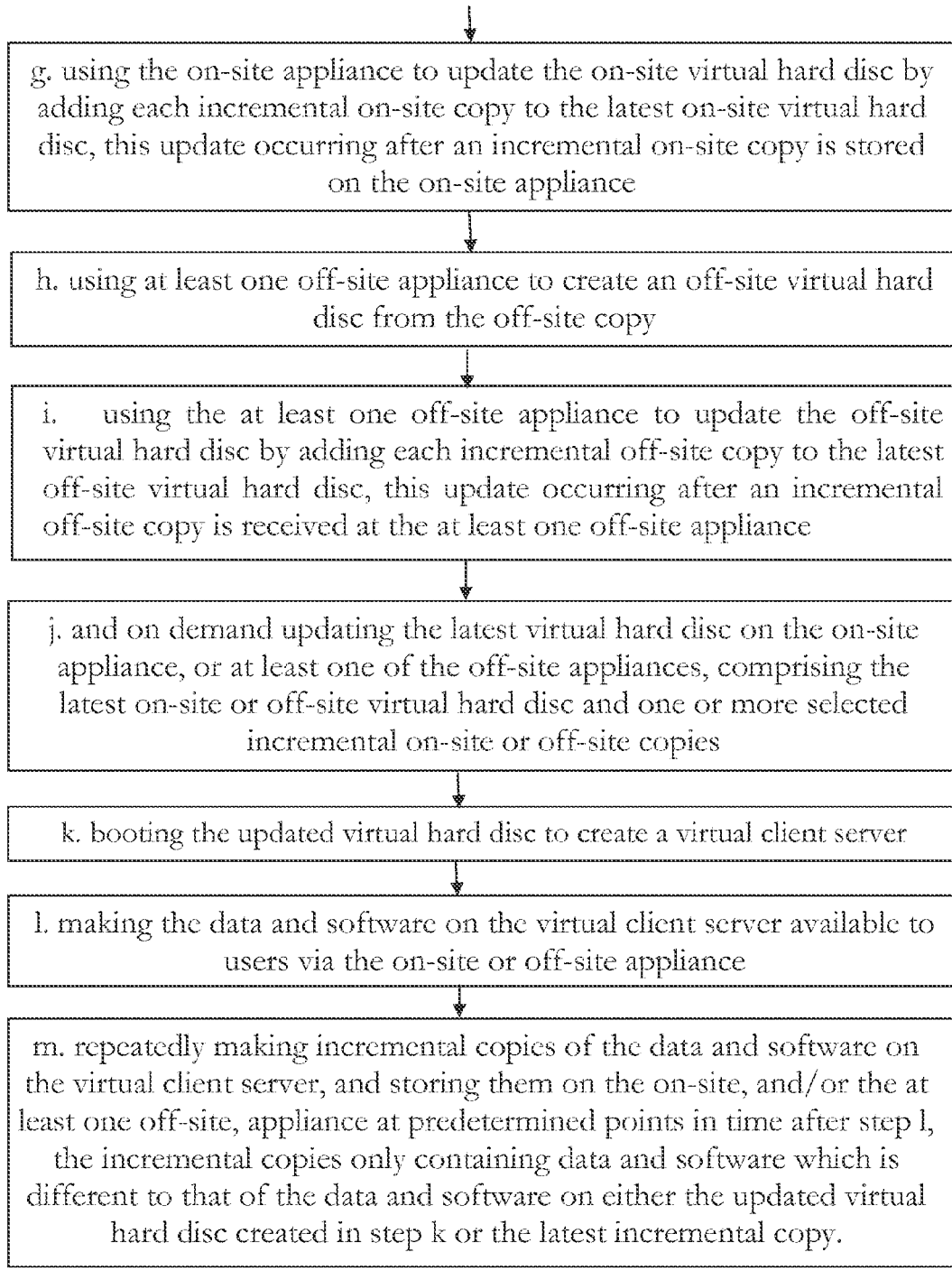
FIGS. 5 to 7 are sequences of method steps according to various aspects of the invention.
Figure 6:
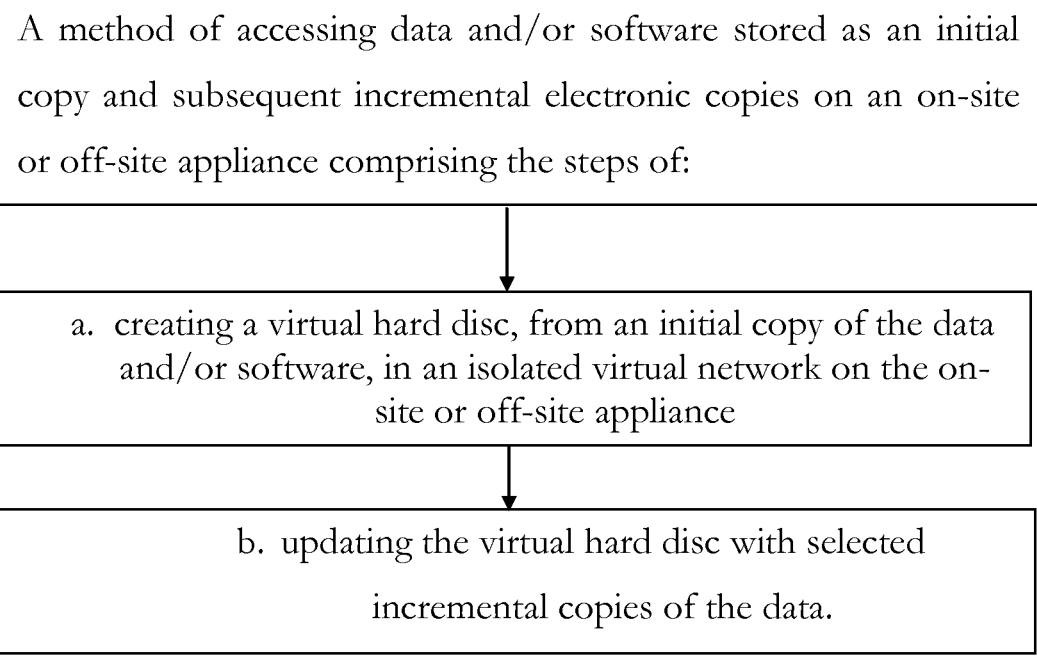
Figure 7:
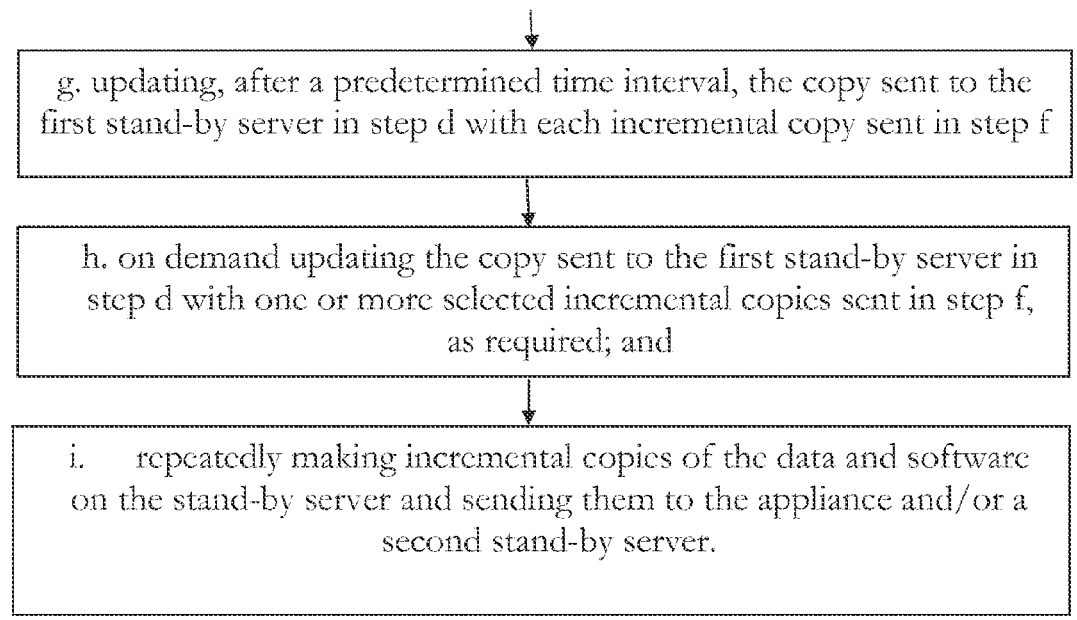

FIG. 5 shows a flowchart of method steps according to the first aspect. FIG. 6 shows a flowchart of method steps according to the second aspect. FIG. 7 shows a flowchart of method steps according to the third aspect.

The invention claimed is:

1. A method of backing-up, and making available, electronic data and software initially stored on a client server located at a client's site, the method comprising the steps of:
 a. providing an on-site appliance at the client's site and connecting it to the client server;
 b. making an on-site copy of data and software, stored on the client server, and storing it in the on-site appliance;
 c. sending an off-site copy of this on-site copy to, and storing it on, at least one off-site appliance at one or more sites remote from the client's site;
 d. repeatedly making incremental on-site copies of the data and software stored on the client server, and storing them on the on-site appliance, at predetermined points in time after step b, each incremental on-site copy only containing data and software which is different to that of either the on-site copy made in step b or the latest incremental copy;
 e. sending an off-site copy of each incremental on-site copy to, and storing it on, the at least one off-site appliance;
 f. using the on-site appliance to create an on-site virtual hard disc from the on-site copy;
 g. using the on-site appliance to update the on-site virtual hard disc by adding each incremental on-site copy to the latest on-site virtual hard disc, this update occurring after an incremental on-site copy is stored on the on-site appliance;
 h. using at least one off-site appliance to create an off-site virtual hard disc from the off-site copy;
 i. using the at least one off-site appliance to update the off-site virtual hard disc by adding each incremental off-site copy to the latest off-site virtual hard disc, this update occurring after an incremental off-site copy is received at the at least one off-site appliance;
 and in response to the client server becoming unavailable to users of the client server:
 j. updating the latest virtual hard disc on the on-site appliance, or at least one of the off-site appliances, comprising the latest on-site or off-site virtual hard disc and one or more selected incremental on-site or off-site copies;
 k. booting the updated virtual hard disc to create a virtual client server;
 l. making the data and software on the virtual client server available to users via the on-site or off-site appliance;
 m. repeatedly making incremental copies of the data and software on the virtual client server, and storing them on the on-site, and/or the at least one off-site, appliance at predetermined points in time after step l, the incremental copies only containing data and software which is different to that of the data and software on either the updated virtual hard disc created in step k or the latest incremental copy.

2. The method of claim 1, wherein the on-site virtual hard disc is updated in step g after a first predetermined time delay, and new off-site virtual hard disc is updated in step i after a second predetermined time delay.

3. The method of claim 1, further comprising the step of removing duplicated data from within the on or off-site copy and subsequent incremental on-site copies of the data.

4. The method of claim 1, further comprising the steps of:
 a. continuing with steps l and m;
 b. providing a new client server at the client's site;
 c. sending a copy of the on-site copy of data and software and selected subsequent incremental copies stored on the on-site or at least one off-site appliance to the new client server;
 d. withdrawing user access to the virtual client server, and using the on-site or off-site appliance to make a final incremental copy of the data and software on the virtual client server;
 e. sending this final incremental copy to the new client server, and
 f. making the data stored on the new client server available to users.

5. The method of claim 4, wherein the copies are merged before being sent to the new client server.

6. The method of claim 1, further comprising the steps of:
a. continuing with steps l and m, wherein the virtual client server is hosted by the at least one off-site appliance;
b. providing a new on-site client server and on-site appliance at the client's site;
c. sending a copy of the off-site copy of data and software and selected subsequent incremental copies to the new on-site appliance;
d. merging the copies sent in step c on the new on-site appliance;
e. sending a copy of these merged copies to the new client server;
f. withdrawing user access to the virtual client server, making a final incremental copy of the data and software on the virtual client server, and sending it to the new on-site appliance;
g. updating the new client server with the final incremental copy; and
h. making the new client server available to users.

7. The method of claim 1 wherein if a connection is temporarily lost during the sending of data over it, the sending is resumed from the point in the data where the connection was lost when the connection becomes available again.

8. The method of claim 1, wherein at least one of the at least one off-site appliance is located at the client's site.

9. The method of claim 1, further including the steps of:
a. providing a stand-by server connected to the on or off-site appliance;
b. sending a stand-by copy of the on-site copy and incremental copies made in steps (b) and (d) to the stand-by server.

10. The method of claim 9, wherein the stand-by server is physical or virtual.

11. The method of claim 9, wherein the stand-by server is located on-site or off-site.

12. The method of claim 9, wherein the sending of the copies in step (b) occurs after a third predetermined time delay after their creation.

13. The method of claim 9, further comprising the steps of:
a. updating the stand-by server by adding one or more selected incremental copies to the copies already stored on it;
b. making the stand-by server available to users of the client server as an alternative server; and
c. backing-up the stand-by server to the on-site appliance or off-site appliance repeatedly.

* * * * *